Patented Nov. 15, 1938

2,137,175

UNITED STATES PATENT OFFICE 2,137,175

MINERAL OIL COMPOSITION AND PROCESS OF PRODUCING SAME

George D. Martin, Nitro, W. Va., assignor, by mesne assignments, to Monsanto Chemical Company, St. Louis, Mo., a corporation of Delaware No Drawing. Application September 12, 1935, Serial No. 40,343

7 Claims. (Cl. 44—9)

This invention relates to improvements in means for the protection of liquid hydrocarbons against the formation of insoluble and gummy products. More particularly the present invention relates to improved materials for use with liquid hydrocarbons which may be used as fuels.

Liquid hydrocarbons for example gasoline as commercially produced when prepared by the cracking of petroleum, possess a tendency on standing to form gums and resinous substances. Gasolines produced by the modern cracking processes are extremely complicated mixtures comprising many constituents, the character of these constituents and the relative proportions of the different constituents depending upon the source of the crude and the particular cracking process employed. Among other constituents the crude cracked gasoline contains unsaturated hydrocarbons, such as for example the olefines and diolefines. The more recent pressure methods of vapor phase cracking result in a considerably higher percentage of diolefines than the older methods. It has thus become necessary to treat the crude products resulting from the more recent cracking processes in some manner to remove the greater part of these more highly unsaturated products. Among these methods of treatment may be mentioned the sulfuric acid treatment and the fuller's earth vapor phase treatment. While these methods have been largely practiced, their use is open to many disadvantages among which is the necessary expense involved.

This development of gums and resins in mineral oil products and more specifically in gasoline causes such undesirable effects when employed in internal combustion engines as sticking of the valve stems and excessive carbon formation.

In accordance with this invention the development of these undesirable characteristics in petroleum products may be readily prevented or materially delayed without substantially increasing the cost of production thereof.

The present invention has for an object the inhibition of the formation of gums and resins in oil compositions.

Another object of the present invention is to provide a new mineral oil product possessing improved properties particularly for use as a fuel for internal combustion engines. The treating means and special compositions disclosed herein are likewise adaptable for use as a transformer oil, as a lubricating means, as a heat circulating medium and analogous uses wherein it is desirable that an improved and satisfactory stable mineral oil product be employed.

Another object is to provide a method and means of the character referred to that will not appreciably increase the cost of production of petroleum products.

Other objects of the invention will be apparent from the following description.

Among the so-called gum inhibitors heretofore employed in the stabilization of gasoline is para amino phenol. One of the objectionable features involved in the use of para amino phenol as a stabilizer against the formation of gum in unstable gasoline is the fact that it colors the gasoline an intense red, thus prohibiting its use in colorless gasolines.

The class of materials which have been found to possess the desirable qualities set forth in that small proportions thereof when incorporated in a relatively unstable oil product, for example gasoline, improves the quality and materially increases the stability thereof, comprise reaction products of ketones and amino hydroxy aromatic compounds, and more specifically the reaction products of ketones and amino phenols.

Illustrative of the preferred class of materials which are particularly suitable as stabilizers according to the present invention are the following: reaction products of acetone, methyl ethyl ketone, methyl-iso-butyl ketone, cyclohexanone, 2-methyl cyclohexanone, 4-methyl cyclohexanone, and acetophenone with ortho and para amino phenols and amino cresols respectively; reaction product of para amino phenol and anthraquinone. It is preferred that said components be reacted in the ratio of substantially equi-molecular proportions although other ratios may be employed. Thus, for example one molecular proportion of the ketone may be reacted with two molecular proportions of the amine and the products so obtained employed as stabilizers according to the present invention.

In order to test the gum inhibiting properties of the preferred class of materials, the following procedure, which is essentially that described by Egloff, Morrell, Lowry and Dryer in Industrial and Engineering Chemistry, vol. 24, pages 1375 to 1382 (1932), was employed.

Into a suitably sized bomb of the type described in the above article, there was placed an 8 ounce oil sample bottle containing 200 c. c. of an unstable gasoline, as for example vapor phase cracked gasoline, to which had been added a small proportion of one of the preferred class of materials, which may be called "gum inhibitors". The lid was placed tightly on the bomb. Substantially one hundred pounds pressure of oxygen was introduced into the bomb by means of a suitable valve. The bomb was then connected by means of a delivery tube with a recording pressure gauge, after which it was heated in a steam bath until a sharp drop in the pressure curve indicated an end of the stability of the unstable fuel, and a rapid reaction of the oxygen with certain unsaturated compounds in the gasoline. This period of stability is frequently called the induction period.

As a specific embodiment of this invention but in no sense to be understood as limitative of the scope thereof, p-amino phenol and acetone were reacted preferably by heating the amino phenol to substantially 160°–170° C. and passing acetone in the vapor phase continuously thereinto for a convenient period of time for example 6 to 8 hours in the presence of a suitable catalyst for example bromine. The crude reaction product so obtained may be incorporated in an unstable mineral oil product, for example vapor phase cracked gasoline, with a marked improvement in the stability thereof. Preferably, however, the crude product is purified, as for example by recrystallization from a convenient solvent, for example acetone. The purified product comprising cream colored crystals melting at 177° C. was found on analysis to have a nitrogen content of 9.34%. Based on the analysis it is believed this purified product possesses the structural formula of

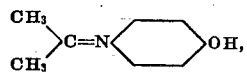

such a body possessing a nitrogen content of 9.40%. The purified reaction product was tested for its gum inhibiting properties by incorporating 20 m. g. thereof in 200 c. c. of a vapor phase cracked gasoline and testing in the manner hereinbefore described. The gasoline so treated was found to possess a period of stability or induction period of 420 minutes. The cracked gasoline employed in the same test without the addition of a gum inhibitor had an induction period of 60 minutes.

As a further specific embodiment of the present invention, 22 parts by weight (substantially one-fifth a molecular proportion) of p-amino phenol and 30 parts by weight (substantially a 33% excess over one-fifth a molecular proportion) of cyclohexanone were reacted by heating to refluxing temperature for a convenient period of time, for example one hour, whereupon the solid separating therefrom was filtered, washed with a small quantity of a convenient and suitable solvent, for example petroleum ether. After drying the washed product 36 parts by weight of a solid melting at 195° C. were obtained. It is believed the reaction may be represented by the following equation:

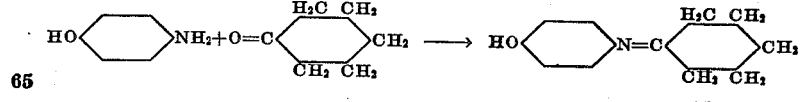 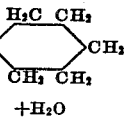
+H₂O

The present invention, however, is not to be understood as limited by any theory as to formulation of the reactions involved in the manufacture of the preferred class of materials.

20 m. g. of the reaction product of p-amino phenol and cyclohexanone produced as described above were incorporated in 200 c. c. of an unstable vapor phase cracked gasoline and the treated gasoline tested for stability in the manner described above. The period of stability or the induction period of the treated gasoline was 300 minutes as compared to an induction period of 60 minutes for the untreated gasoline. Furthermore, gasoline stabilized by means of the preferred class of materials, for example the reaction product of para amino phenol and cyclohexanone showed a marked improvement over para amino phenol as to discoloration of the gasoline.

As a further test showing the gum inhibiting properties of the preferred class of compounds, a copper dish gum test was carried out in the well-known manner on a vapor phase cracked gasoline containing the preferred gum inhibitors and on the same untreated gasoline. Thus as one such test, 10 m. g. of the reaction product of cyclohexanone and para amino phenol, prepared as described above, was incorporated in 100 c. c. of vapor phase cracked gasoline, the solution placed in a copper dish and the liquid evaporated therefrom on a steam bath. The gum formed was 0.0170 grams. A similar test carried out on the untreated gasoline produced 0.5735 grams of gum.

As further specific examples showing the use of the preferred class of materials as stabilizers of unstable mineral oil products, for example cracked gasoline, the reaction product of ortho amino phenol and acetone, reaction product of para amino phenol and methyl-iso-butyl ketone, reaction product of para amino phenol and anthraquinone and reaction product of para amino phenol and acetophenone were tested in a vapor phase cracked gasoline in the manner described above with the following result:

| Inhibitor | Weight of inhibitor in Mgs. | C. c. of gasoline | Induction period in minutes |
|---|---|---|---|
| Reaction product o-amino phenol and acetone | 20 | 200 | 170 |
| Reaction product p-amino phenol and methyl-iso-butyl ketone | 20 | 200 | 180 |
| Reaction product p-amino phenol and anthraquinone | 20 | 200 | 230 |
| Reaction product p-amino phenol and acetophenone | 20 | 200 | 190 |
| None | | 200 | 60 |

From the data hereinbefore set forth, it is readily shown that the preferred class of compounds constitutes an important class of stabilizers and inhibitors of gum formation.

If convenient or desirable, if the inhibitor to be added to the unstable oil product, for example gasoline, is not readily soluble therein, it may be dissolved in a suitable solvent and the solution of the inhibitor thus prepared added thereto.

Other similar oil compositions designed for particular uses may be prepared in the manner described by substituting the desired oil fractions or cut and adding the necessary quantity of gum inhibitor or stabilizer thereto. To produce the effect desired a quantity of inhibitor equal to from 0.001 to 0.05% of the weight of the oil product is preferably employed.

Other ratios of the preferred class of materials than those set forth may be employed, also other methods of testing may be employed as is readily apparent to those skilled in the art to which this invention pertains.

What is claimed is:

1. A composition of matter comprising a hydrocarbon oil containing a substantial quantity of unsaturates and a compound possessing the structural formula of OH—R—N=R' where R is phenylene and R' is a member of a group consisting in a cyclohexylidene and an anthronidene radical.

2. Gasoline produced by the cracking of mineral oils to which has been added a small proportion of anthronidene para amino phenol.

3. A composition of matter comprising a hydrocarbon oil containing a substantial quantity of unsaturates and cyclohexylidene amino phenol.

4. A composition of matter comprising a cracked hydrocarbon motor fuel of the type which tends to deteriorate on storage as evidenced by gum formation having incorporated therein a small proportion of cyclohexylidene amino phenol.

5. A composition of matter comprising a cracked hydrocarbon motor fuel of the type which tends to deteriorate on storage as evidenced by gum formation having incorporated therein a small proportion of cyclohexylidene para amino phenol.

6. Gasoline produced by the cracking of mineral oils to which has been added a small proportion of cyclohexylidene amino phenol.

7. Gasoline produced by the cracking of mineral oils to which has been added a small proportion of cyclohexylidene para amino phenol.

GEORGE D. MARTIN.